United States Patent

Tharp et al.

Patent Number: 5,177,941
Date of Patent: Jan. 12, 1993

[54] FLOWER STRIPPING AND THORN DULLING IMPLEMENT

[76] Inventors: Gale V. Tharp, 2929 Hirschfield, Apt. 1402, Spring, Tex. 77373; John F. Ivers, 3451 Tanglebrush Dr., Apt. 204, Spring, Tex. 77380

[21] Appl. No.: 701,024

[22] Filed: May 16, 1991

[51] Int. Cl.⁵ ............................................. A01D 1/00
[52] U.S. Cl. .................................... 56/1; 56/239; 56/400.01
[58] Field of Search ............. 56/126, 239, 1, 400.01, 56/400.04, 400.21, 328.1; 7/114; 241/169.2; 172/371, 376, 378

[56] References Cited

U.S. PATENT DOCUMENTS 1,533,405  4/1925  Griffin ........................... 241/169.2

FOREIGN PATENT DOCUMENTS 925459   9/1947  France ............................. 172/376
82225    9/1919  Switzerland ..................... 241/169.2
555793   9/1943  United Kingdom ............. 241/169.2

Primary Examiner—Terry Lee Melius
Attorney, Agent, or Firm—Kenneth A. Roddy

[57] ABSTRACT

A hand-held flower stripping and thorn dulling implement has a handle portion and comb portion extending outwardly from one end thereof which has a row of generally vertical laterally spaced fingers at its outer end. The implement will strip a whole bundle of flowers at one time. The fingers are smooth and rounded configurations spaced apart sufficient to glide along the stems of the bundle and strip the leaves from the stems while also rounding off the tips of thorns of flowers having thorny stems. The handle portion extends angularly upward and rearward relative to the comb portion to place the fingers of the user above the stems of the bundle of flowers and facilitate a comfortable gripping position. In one embodiment, the comb portion and fingers are formed of length of rigid wire bent into a series of continuous, generally vertical elongate loops defining the laterally spaced fingers. In use, a bundle of flowers is placed under the arm of the user with the flower heads cradled between the elbow and the body and the stems positioned loosely along the forearm toward the wrist and the comb portion is pulled through the stem bundle away from the heads of the flowers toward the wrist in a smooth stroking action and the bundle is rotated as needed until the unwanted leaves are removed from the stems and the tips of the thorns of flowers having thorns are dulled sufficient to prevent pricking.

3 Claims, 1 Drawing Sheet

U.S. Patent
Jan. 12, 1993
5,177,941
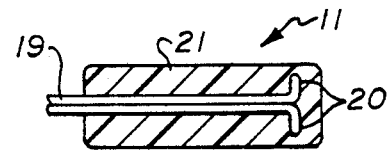
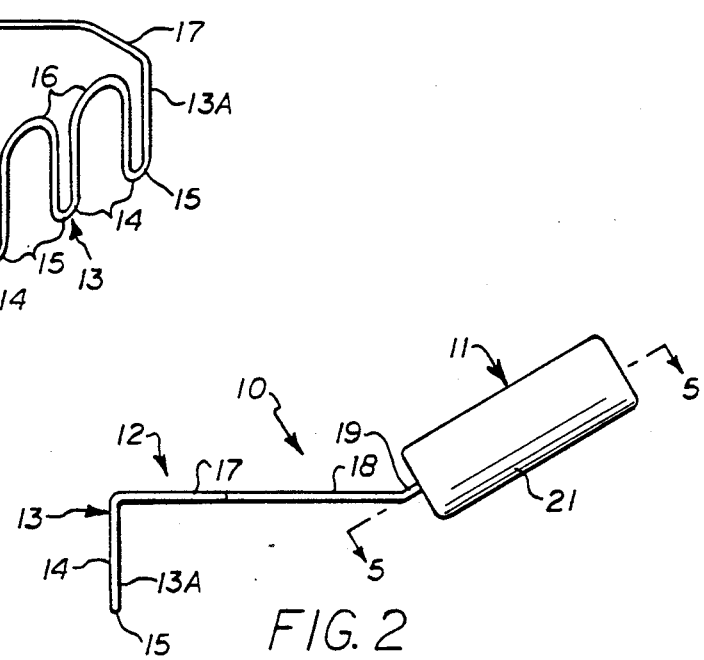
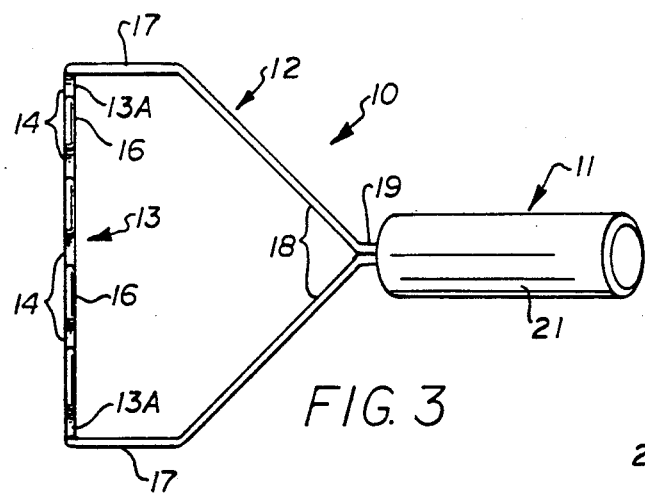
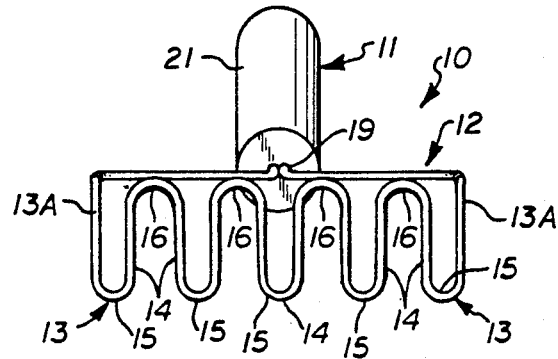

FLOWER STRIPPING AND THORN DULLING IMPLEMENT

BACKGROUND OF THE INVENTION

1. Field of the Invention

This invention relates generally to floral implements, and more particularly to a flower stripping and thorn dulling implement particularly useful in stripping roses or other flowers having thorns.

2. Brief Description of the Prior Art

Flowers require preparation, or stripping, prior to being displayed in floral arrangements. This preparation includes stripping the excess leaves and some stem projections from the main stem of the flower to provide an attractive arrangement. The stripping of roses is particularly difficult because of the thorns projecting from the main stem and the risk of ripping the stem by accidentally pulling off thorns.

Roses are usually shipped to floral shops in bundles of twenty-five flowers. Heretofore, the method of stripping roses was to take the roses from the bundle and strip them one at a time using a flower stripping implement. The commonly used flower stripping implement is a small spring loaded clip device, similar in construction to a hinged V-shaped staple puller. A person holds the top portion, or head, of the flower in one hand and clips the stripping implement around the stem of the rose in a pinching action with the other hand and then pulls the flower stripper along the length of the stem.

Needless to say, the prior art method is time consuming, since only one flower can be done at a time. Many roses are ruined using the prior art stripping implement because it can be clipped onto the stem too tight and when pulled along the stem it will tear off one or more complete thorns and often peel off a strip of the outer layer of the stem with the thorn.

When a thorn is pulled off the stem, it allows air to enter the circulatory system of the rose. The air will travel up through the stem of the rose and into the rose head which causes the rose head to go limp very quickly. Thus, the flower will have a shorter life.

There are several patents which disclose rake-like garden implements and culinary devices, none of which would be suitable for use in stripping flowers or have the structural and utilitarian features the present invention.

Rohrer, U.S. Pat. No. 790,228 discloses a culinary device for scraping hard surfaces and preparing vegetables which has a handle, a shank, and a rectangular head plate with pointed projections on two edges and cutting surfaces on the other two edges.

McCaskill, U.S. Pat. No. 2,497,506 discloses a garden tool for use as a rake, hoe, or ground leveling means. The tool has a rectangular, generally L-shaped, blade with pointed teeth along one edge.

The present invention is distinguished over the prior art in general, and these patents in particular by a hand-held flower stripping and thorn dulling implement having a handle portion and comb portion extending outwardly from one end thereof which has a row of generally vertical laterally spaced fingers at its outer end. The implement will strip a whole bundle of flowers at one time. The fingers are smooth and rounded configurations spaced apart sufficient to glide along the stems of the bundle and strip the leaves from the stems while also rounding off the tips of thorns of flowers having thorny stems. The handle portion extends angularly upward and rearward relative to the comb portion to place the fingers of the user above the stems of the bundle of flowers and facilitate a comfortable gripping position. In one embodiment, the comb portion and fingers are formed of length of rigid wire bent into a series of continuous, generally vertical elongate loops defining the laterally spaced fingers. In use, a bundle of flowers is placed under the arm of the user with the flower heads cradled between the elbow and the body and the stems positioned loosely along the forearm toward the wrist and the comb portion is pulled through the stem bundle away from the heads of the flowers toward the wrist in a smooth stroking action and the bundle is rotated as needed until the unwanted leaves are removed from the stems and the tips of the thorns of flowers having thorns are dulled sufficient to prevent pricking.

SUMMARY OF THE INVENTION

It is therefore an object of the present invention to provide a hand-held implement for quickly and easily stripping the leaves from flower stems.

It is another object of this invention to provide a hand-held implement for quickly and easily dulling the tip of the thorns of flowers having thorns on their stems.

Another object of this invention is to provide a hand-held implement for stripping the leaves and simultaneously dulling the tip of the thorns of flowers having thorns on their stems.

Another object of this invention is to provide a hand-held implement for stripping the leaves and dulling the thorns on a whole bundle of flowers at a time thereby greatly reducing the time, labor, and expense, normally required for the stripping operation.

Another object of this invention is to provide a hand-held implement for stripping the leaves and dulling the tip of the thorns of flowers which does not damage the flower or thorns.

Another object of this invention is to provide a hand-held implement for stripping the leaves and dulling the tip of the thorns of flowers which does not tear the stem of the flower or expose the circulatory system of the flower to air thereby maintaining the flower in a sealed condition resulting in longer life of the flower.

A further object of this invention is to provide a hand-held implement for stripping the leaves and dulling the tip of the thorns of flowers which safely places the hand of the user in a comfortable position away from the thorns during the stripping operation.

A still further object of this invention is to provide a hand-held implement for stripping the leaves and dulling the tip of the thorns of flowers which is simple in construction, economical to manufacture, and is rugged and reliable in use.

Other objects of the invention will become apparent from time to time throughout the specification and claims as hereinafter related.

The above noted objects and other objects of the invention are accomplished by a hand-held flower stripping and thorn dulling implement having a handle portion and comb portion extending outwardly from one end thereof which has a row of generally vertical laterally spaced fingers at its outer end. The implement will strip a whole bundle of flowers at one time. The fingers are smooth and rounded configurations spaced apart sufficient to glide along the stems of the bundle and strip the leaves from the stems while also rounding off the tips of thorns of flowers having thorny stems. The handle portion extends angularly upward and rearward relative to the comb portion to place the fingers of the user above the stems of the bundle of flowers and facilitate a comfortable gripping position. In one embodiment, the comb portion and fingers are formed of length of rigid wire bent into a series of continuous, generally vertical elongate loops defining the laterally spaced fingers. In use, a bundle of flowers is placed under the arm of the user with the flower heads cradled between the elbow and the body and the stems positioned loosely along the forearm toward the wrist and the comb portion is pulled through the stem bundle away from the heads of the flowers toward the wrist in a smooth stroking action and the bundle is rotated as needed until the unwanted leaves are removed from the stems and the tips of the thorns of flowers having thorns are dulled sufficient to prevent pricking.

BRIEF DESCRIPTION OF THE DRAWINGS

FIG. 1 is an isometric view of a preferred flower stripping and thorn dulling implement in accordance with the present invention.

FIG. 2 is a side elevation of the flower stripping and thorn dulling implement.

FIG. 3 is a top plan view of the flower stripping and thorn dulling implement.

FIG. 4 is front elevation view of the flower stripping and thorn dulling implement.

FIG. 5 is a cross section through the handle portion of the implement taken along line 5—5 of FIG. 2.

DESCRIPTION OF THE PREFERRED EMBODIMENT

Referring to the drawings by numerals of reference, there is shown in FIG. 1-4, a preferred flower stripping and thorn dulling implement 10 particularly useful in stripping roses or other flowers having thorns. The implement 10 is a generally rake-like construction having a handle portion 11 at one end of a comb portion 12.

In a preferred embodiment, the comb portion 12 is described as being formed of bent wire, however, it should be understood that the implement including the comb portion may be formed of other materials such as molded plastic.

The front end of the comb portion 12 is formed of rigid wire bent into a series of continuous, generally vertical elongate loops 13 defining a series of laterally spaced fingers 14. The fingers 13 are curved at their bottom ends 15 and the wire portion joining the fingers forms a series of alternately spaced curves 16 between the top ends of the fingers.

The wire forming the outer fingers 13A at each side of the comb portion 12 extends upwardly and is curved rearwardly generally perpendicular to the fingers to form a pair of laterally spaced parallel straight sections 17. As seen from the top (FIG. 3), the wire extends from the straight sections 17 at each side in a generally Y-shaped configuration 18 diverging toward the handle portion 11. The diverging ends of the wire are secured together and form a central straight section 19 which is surrounded by the handle portion 11, and the terminal ends of the wire are bent outwardly to form opposed projections 20 (FIG. 5).

As seen from the side (FIG. 2), the central straight section 19 formed by the diverging ends of the wire is bent upwardly whereby the axis of the handle portion 11 extends angularly relative to the main longitudinal axis of the Y-shaped portion 18. In other words, the fingers are perpendicular to the Y-shaped portion 18 and the handle portion 11 extends angularly upward relative to the Y-shaped portion.

The angle of the handle is sufficient to provide a comfortable position for the wrist and to protect the fingers of the user from thorns during the stripping operation. A handle angle of approximately thirty-degrees has been found satisfactory.

The handle portion 11 has a handle member 21 which surrounds the central straight section 19 and is secured thereto. In the illustrated embodiment the handle is molded to the straight section 19 and the opposed projections 20 at the terminal ends of the wire form anchor the wire form into the handle 21 to prevent it from becoming loose or pulled off. Other methods conventional in the art may also be used to secure the handle 21 to the bent wire form. It should also be understood, that the handle 21 may be provided with depressions or otherwise shaped to facilitate gripping by the user.

METHOD OF USE

The following discussion will explain how the flower stripping and thorn dulling implement 10 is used in stripping flowers, and particularly roses for example.

Flowers require preparation, or stripping, prior to being displayed in floral arrangements. This preparation includes stripping the excess leaves and some stem projections from the main stem of the flower to provide an attractive arrangement. The stripping of roses is particularly difficult because of the thorns projecting from the main stem and the risk of ripping the stem by accidentally pulling off thorns.

Roses are usually shipped to floral shops in bundles of twenty-five flowers. Heretofore, the method of stripping roses was to take the roses from the bundle and strip them one at a time. The present implement allows one to strip a whole bundle at one time.

The bundle of flowers (approximately twenty-five) is placed under the arm of the user with the flower heads cradled between the elbow and the body and the stems positioned loosely along the forearm toward the wrist. The implement 10 is held in the other hand by the handle 21 and the comb portion 12 is placed at the top of bundle of stems and is pulled through the stem bundle away from the heads of the flowers (toward the wrist) in a smooth stroking action.

After a couple of strokes with the implement, the bundle is rotated and the stroking is continued until the unwanted leaves are removed from the stems. After just a few strokes, the whole bundle will be completed.

During the stroking operation, the fingers of the implement pass through the stem bundle and the curved surfaces of the fingers gently remove the leaves. In stripping roses and other flowers having thorns, the curved surfaces of the fingers do not strip off the thorns, but rather rolls over the thorns rounding off the tips of the thorns. In other words, the thorns are not broken off but are just dulled such that they won't prick. The thorns are not damaged, and the flower remains sealed.

The present implement prevents air from entering the circulatory system of the rose and traveling through the stem of the rose into the rose head which causes the rose head to go limp very quickly. Thus, because the flower remains sealed, it will last much longer than flowers stripped by other methods.

The angled handle of the implement provides a comfortable position for the wrist to prevent fatigue and also places the fingers of the user above the thorns during the stripping operation.

While this invention has been described fully and completely with special emphasis upon a preferred embodiment, it should be understood that within the scope of the appended claims the invention may be practiced otherwise than as specifically described herein.

We claim:

1. A hand-held flower stripping and thorn dulling implement comprising:

a handle member, and a comb portion extending outwardly from one end of said handle member and having a row of generally vertical laterally spaced fingers at its outer end configured to be pulled through a bundle of flower stems, said comb portion formed of a length of rigid bent wire bent into a series of continuous, generally vertical elongate loops having a smooth curved surface at their bottom ends and a smooth curved surface between their upper ends joining them together in laterally spaced relation defining said fingers, and said fingers being spaced apart sufficient to glide along the stems of the bundle and strip the leaves from the stems while rounding off the tips of thorns of flowers having thorny stems when pulled therethrough, the ends of said rigid wire forming said fingers extending rearwardly of distance from the top of the outermost said fingers and generally perpendicular thereto to form a straight portion at each side of said row of fingers and then diverging toward one another from the straight portions to form a generally Y-shaped portion in a plane coextensive with the tops of the fingers and the diverging ends secured together forming a central straight portion which extends angularly upward and rearward relative to said Y-shaped portion, and said handle member secured on said central straight portion to prevent removal therefrom due to axial pulling forces and the longitudinal axis of said handle member being disposed upward and rearward relative to said Y-shaped portion and said fingers at a sufficient angle to place the fingers of the user above the stems of the bundle of flowers and facilitate a comfortable gripping position when said comb portion is pulled through the bundle of flower stems.

2. A hand-held flower stripping and thorn dulling implement according to claim 1 wherein the terminal ends of said central straight section are bent outwardly to form opposed projections, and said projections are anchored in said handle member to prevent it from being pulled from said comb portion due to opposed axial pulling forces when said comb portion is pulled through the bundle of flower stems.

3. A method of stripping flowers and dulling the thorns of flowers of the type having thorns on the stems comprising;

providing a flower stripping and thorn dulling implement having a handle portion and a comb portion extending outwardly from one end of the handle portion and having a row of generally vertical laterally spaced fingers at its outer end adapted to be pulled through a bundle of flower stems, said fingers being smooth and rounded configurations spaced apart sufficient to glide along the stems of the bundle and strip the leaves from the stems while rounding off the tips of thorns of flowers having thorny stems when pulled therethrough, placing a bundle of flowers to be stripped under the arm of the user with the flower heads cradled between the elbow and the body and the stems positioned loosely along the forearm toward the wrist, gripping the implement handle by the other hand and placing the comb portion of the implement at the top of the bundle of stems and then pulling the comb portion through the stem bundle away from the heads of the flowers toward the wrist in a smooth stroking action, and after stroking with the implement, rotating the bundle and continuing the stroking and rotating until the unwanted leaves are removed from the stems and the tips of the thorns of the flowers having thorns on their stems are dulled sufficient to prevent pricking.

* * * * *